(12) United States Patent
Scholte (10) Patent No.: US 9,084,045 B2
(45) Date of Patent: Jul. 14, 2015

| | | |
|---|---|---|
| (54) | ACOUSTIC TRANSDUCER ASSEMBLY | |
| (75) | Inventor: | Rick Scholte, Eindhoven (NL) |
| (73) | Assignee: | SORAMA HOLDING B.V., Eindhoven (NL) |
| ( * ) | Notice: | Subject to any disclaimer, the term of this patent is extended or adjusted under 35 U.S.C. 154(b) by 96 days. |
| (21) | Appl. No.: | 13/514,916 |
| (22) | PCT Filed: | Dec. 6, 2010 |
| (86) | PCT No.: | PCT/EP2010/068971 |
| | § 371 (c)(1), (2), (4) Date: | Aug. 24, 2012 |
| (87) | PCT Pub. No.: | WO2011/069964 |
| | PCT Pub. Date: | Jun. 16, 2011 |
| (65) | Prior Publication Data | |
| | US 2013/0094678 A1 | Apr. 18, 2013 |
| (30) | Foreign Application Priority Data | |
| Dec. 11, 2009 (EP) ..................................... 09178931 | | |
| (51) | Int. Cl. | |
| | H04R 25/00 | (2006.01) |
| | H04R 1/02 | (2006.01) |
| | H04R 19/01 | (2006.01) |
| | H04R 19/00 | (2006.01) |
| | G01H 3/12 | (2006.01) |
| | H04R 1/40 | (2006.01) |
| (52) | U.S. Cl. | |
| | CPC ............... *H04R 1/025* (2013.01); *G01H 3/125* (2013.01); *H04R 1/406* (2013.01); *H04R 19/005* (2013.01); *H04R 19/016* (2013.01); *H04R 2201/401* (2013.01); *H04R 2201/403* (2013.01) | |
| (58) | Field of Classification Search | |
| | CPC .......... H04R 1/02; H04R 1/025; H04R 1/046; H04R 1/265; H04R 3/06; H04R 19/005; H04R 19/016; H04R 2201/401; H04R 2201/403 | |
| | USPC ......... 381/113, 116, 173, 174, 175, 182, 190, 381/191, 85; 307/400; 29/25.41, 594; 438/53; 257/415, 416, 417; 703/25 | |
| | See application file for complete search history. | |

(56) References Cited

U.S. PATENT DOCUMENTS

| | | | |
|---|---|---|---|
| 3,736,436 A * | 5/1973 | Crites | 307/400 |
| 7,995,770 B1 * | 8/2011 | Simon | 381/82 |
| 2004/0225489 A1 * | 11/2004 | Fenech Saint Genieys et al. | 703/25 |

FOREIGN PATENT DOCUMENTS

| | | |
|---|---|---|
| EP | 2 114 085 | 11/2009 |
| WO | WO 03/079486 | 9/2003 |
| WO | WO 2009/130243 | 10/2009 |

OTHER PUBLICATIONS

International Search Report for PCT/EP2010/068971, mailed Feb. 18, 2011.
Written Opinion of the International Searching Authority for PCT/EP2010/068971, mailed Feb. 18, 2011.

* cited by examiner

*Primary Examiner* — Huyen D Le
(74) *Attorney, Agent, or Firm* — Nixon & Vanderhye P.C.

(57) ABSTRACT

An acoustic transducer assembly is disclosed. It comprises a layer of support material. An electric circuit is integrated with the layer of support material. A plurality of transducers are mounted on the layer of support material to form at least part of an array of transducers A recess or aperture is provided between a pair of the transducers of the array of transducers. The recess or aperture can comprise a recess or aperture of the support material between a pair of transducers of the plurality of transducers mounted on the layer of support material. The layer of support material can be rigid or flexible. A rigid support can be used for supporting at least one transducer of the plurality of transducers.

11 Claims, 6 Drawing Sheets

ACOUSTIC TRANSDUCER ASSEMBLY

This application is the U.S. national phase of International Application No. PCT/EP2010/068971, filed 6 Dec. 2010, which designated the U.S. and claims priority to EP Application No. 09178931.3, filed 11 Dec. 2009, the entire contents of each of which are hereby incorporated by reference.

FIELD OF THE INVENTION

The invention relates to an acoustic transducer assembly. The invention further relates to an acoustic transducer array. The invention further relates to an acoustic holography system. The invention further relates to a method of performing an acoustic measurement.

BACKGROUND OF THE INVENTION

Acoustic transducer arrays are known for use in acoustic or sound imaging applications, wherein the sound-field is sampled at a certain distance from the source of sound using acoustic transducers, and the resulting sound pressure, particle velocity, or sound intensity is measured and visualized. Also, wave-form calculation can be performed before visualization to determine the sound-field on positions other than the original measured positions. Examples of these wave-form reconstruction methods are beam-forming, acoustic holography, and near-field acoustic holography (NAH).

U.S. Pat. No. 7,092,539 discloses a printed circuit board array responsive to aeroacoustic waves. The array comprises a printed circuit board having a first surface and an opposing second surface, and a plurality of sockets distributed over the first surface of the printed circuit board. A plurality of microphone packages are received in the corresponding sockets and contain at least one microphone responsive to an aeroacoustic wave. Each of the microphones includes a semiconductor substrate, a cavity formed in said substrate, a diaphragm covering the cavity, and a vent channel in fluid communication with the cavity and an atmosphere surrounding said array. A signal processor is disposed on the circuit board. An input of the signal processor is coupled to an output of the plurality of microphone packages. The processor beamforms signals received from the plurality of microphone packages and outputs a combined signal therefrom.

SUMMARY OF THE INVENTION

It would be advantageous to have an improved acoustic transducer assembly. To better address this concern, a first aspect of the invention provides an acoustic transducer assembly comprising a layer of support material;

an electric circuit integrated with the layer of support material;

a plurality of transducers mounted on the layer of support material to form at least part of an array of transducers; and a recess or aperture between a pair of the transducers of the array of transducers.

The recess or aperture helps to improve acoustic properties of the assembly by reducing the effect of the assembly on acoustic signals in a neighborhood of the assembly. For example, acoustic reflections may be reduced. Moreover, an acoustic impedance of the acoustic transducer assembly may be reduced. Multiple recesses and/or apertures may be provided between pairs of transducers. The recesses and/or apertures may be constructed to form an open space between a pair of transducers, allowing acoustic waves originating from a measurement area to pass in between the pair of transducers without being obstructed or reflected. The layer of support material may comprise a substrate. The layer of support material may comprise a base layer of a structure such as a chip, multichip module (MCM), or printed circuit board.

The recess or aperture may comprise a recess or aperture in the support material between a pair of transducers of the plurality of transducers mounted on the layer of support material. The recess or aperture improves acoustic properties of the layer of support material. Such an aperture in the support material is easy to manufacture. A plurality of recesses or apertures may be provided in a single piece of support material.

The assembly may comprise an acoustically absorbing material in the recess or aperture. This helps to further reduce reflections and/or improve acoustic properties of the assembly.

The layer of support material may be rigid. This may help to make a robust assembly.

Alternatively, the layer of support material may be flexible. This may make the assembly useable in more situations. The transducers may be moved with respect to another by allowing the support material to bend. Consequently, more transducer configurations can be realized with the assembly. For example, the support material and the electric circuit may form a flexible printed circuit.

The assembly may comprise a rigid support for supporting at least one transducer of the plurality of transducers. This allows to provide rigidity while using a flexible layer of support material.

The rigid support may be configurable to change a spacing of the at least one transducer. This allows to change the spacing of the transducers. For example, the rigid support is arranged for supporting a plurality of the transducers mounted on the support material, and allows to change the spacing of these transducers.

At least part of the flexible layer of support material may be arranged for bending away from a measurement area when the spacing is reduced. By bending away from the measurement area, the influence on the acoustic properties by the layer of support material is reduced.

The acoustic transducer assembly may comprise a multi-layered array of transducers, wherein the plurality of transducers mounted on the layer of support material may form at least part of the multi-layered array. Double or multi-layered arrays may be used to cancel background noise or reflections and/or increase signal-to-noise ratios or precision. For example, the assembly comprises a plurality of layers of support material integrated with electric circuits and having transducers mounted thereon. One or more apertures in the layers of support material may help to enable the acoustic signals to pass from one layer of the acoustic transducer array to the next.

Two layers of the multi-layered array may be formed by transducers mounted on opposite sides of the printed circuit. This may reduce the cost of materials and/or manufacturing. Moreover, it may have little to none disturbing effect on the acoustic properties.

At least one of the transducers may be mounted at an edge of the printed circuit board. Moreover, the assembly may be arranged for measuring acoustic signals originating from a measurement area intersecting an extended plane defined by the layer of support material. This way, the acoustic behavior of the assembly may be further improved.

The assembly may comprise a connector. The electronic circuit may be arranged for connecting at least a subset of the plurality of transducers with the connector. This way, the electric signals to and/or from the subset of transducers may be controlled from a central connector.

The assembly may comprise a handle for enabling a user to hold the assembly in front of a target area. This allows free-hand measurements.

The handle may comprise signal processing electronics for processing a signal measured by at least one transducer of the plurality of transducers. This allows to keep the signal processing electronics out of the way.

An aspect of the invention provides an acoustic holography system for reconstructing a sound source distribution in a measurement area, comprising an acoustic transducer assembly as set forth.

An aspect of the invention provides a method of performing an acoustic measurement, comprising capturing a plurality of acoustic signals using an acoustic transducer assembly as set forth.

It will be appreciated by those skilled in the art that two or more of the above-mentioned embodiments, implementations, and/or aspects of the invention may be combined in any way deemed useful. Modifications and variations of the systems and methods described herein can be carried out by a person skilled in the art on the basis of the present description.

BRIEF DESCRIPTION OF THE DRAWINGS

These and other aspects of the invention are apparent from and will be elucidated with reference to the embodiments described hereinafter. In the drawings.

The drawings show diagrams of examples of acoustic transducer assemblies. Modifications or variations of the examples shown are within reach of the skilled person in view of the present disclosure. In the drawings, similar items have been labeled with the same reference numeral.

DETAILED DESCRIPTION OF EMBODIMENTS

Figure 1:
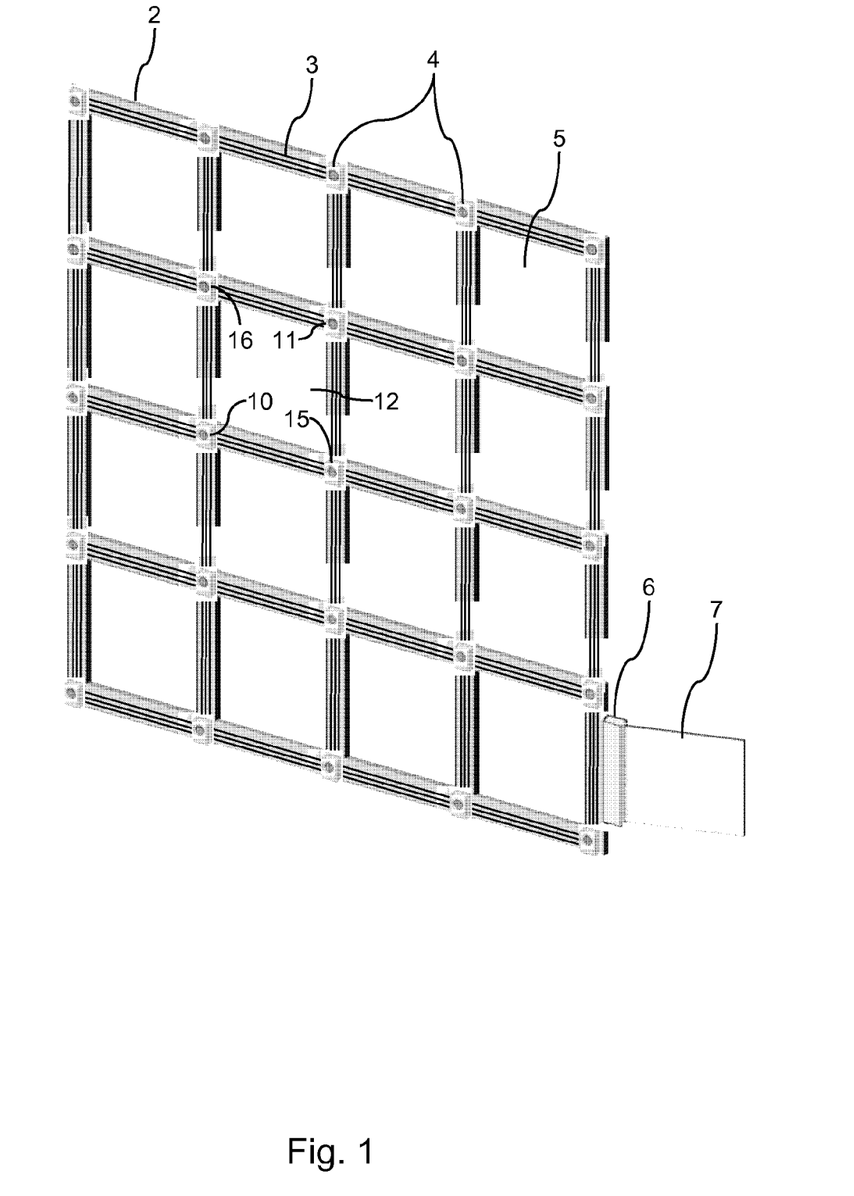
FIG. 1 shows a perspective view of an acoustic transducer assembly.
Figure 2:
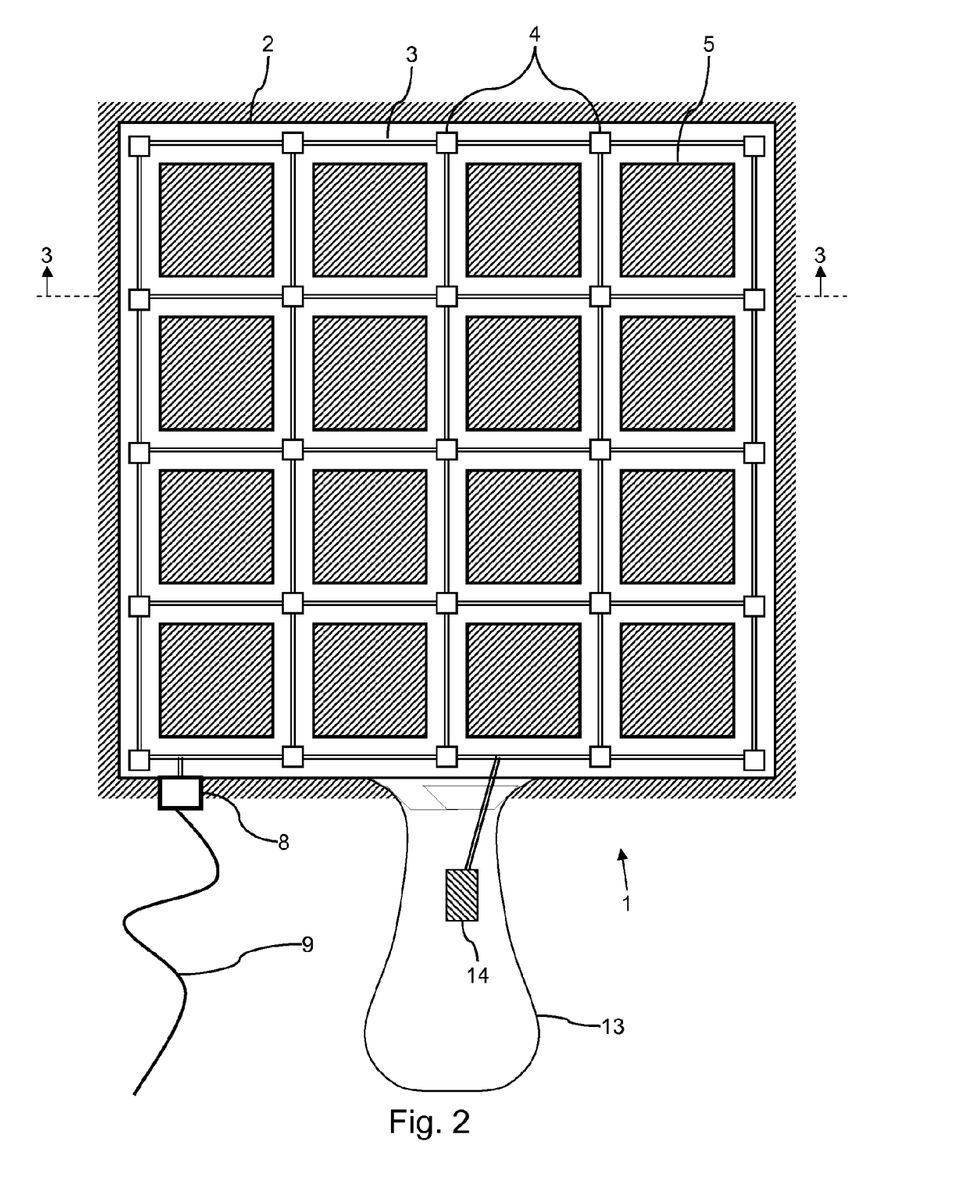
FIG. 2 shows a front view of an acoustic transducer assembly.
Figure 3:
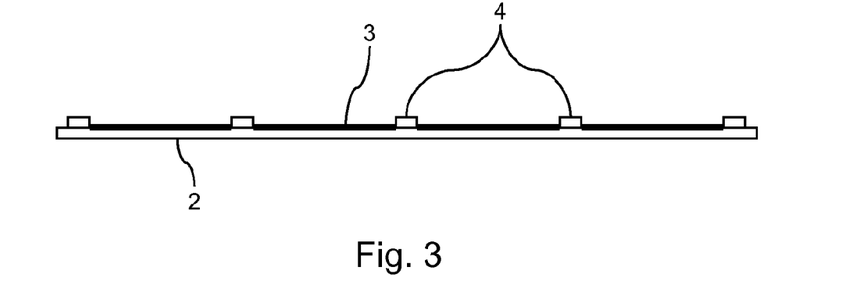
FIG. 3 shows a cross sectional view of an acoustic transducer assembly.

FIG. 1 shows a perspective view of an acoustic transducer assembly. FIG. 2 shows a frontal view of a variation of the acoustic transducer assembly. FIG. 3 shows a cross sectional view of the acoustic transducer assembly shown in FIG. 2. In these figures, similar items have been given the same reference numerals.

Referring to FIG. 1, the acoustic transducer assembly comprises a layer of support material 2. The layer of support material may form a substrate, and may comprise a base layer of a structure such as a chip, multi-chip module (MCM), printed circuit board. For example, silicon, fiberglass, or ceramic may be used as the material. These materials are frequently used for e.g. chips, printed circuit boards, and multi-chip modules, respectively. The electric circuit 3 may be part of the chip, multi-chip module, or printed circuit board. The layer of support material 2 may comprise a support material which is commonly used in printed circuit boards (PCBs). However, this is not a limitation. The support material may also be provided by silicon wafer material or another material which allows to support an integrated electronic circuit. It is also possible to use a flexible layer of support material, for example of the kind used in flexible printed circuits. The layer of support material 2 may comprise a planar layer, for example a rigid sheet material. An electric circuit 3 is integrated with the layer of support material, for example in a way which is known from the field of printed circuit board manufacturing. A plurality of transducers 4 are mounted on the layer of support material. The transducers 4 are mounted on the same side of the layer of support material, however this is not a limitation. These transducers 4 form at least part of an array of transducers. An aperture 12 is provided between a pair 10,11 of transducers of the array of transducers. More specifically, in the shown example, the recess 12 is encircled by four neighboring transducers 10, 11, 15, 16. More apertures may be provided, as is shown in the figure. In the figure, an aperture 5 is provided between every group of four neighboring transducers. However, other arrangements of the apertures with respect to the transducers are possible. Instead of apertures, recesses may be used.

As shown in FIG. 1, the recess or aperture 12 may comprise a recess or aperture 12 in the layer of support material 2. Such an aperture 12 may comprise a hole through the layer of support material. Alternatively, the layer of support material 2 may be non-planar, and be shaped to move out of a surface defined by the transducer array in between a pair of the transducers, to form a recess in between the pair of transducers. The recess or aperture may be so formed to create an open space in between two positions on the layer of support material on which the transducers are mounted. This open space may form an opening at least towards a measurement area, to let acoustic waves originating from the measurement area through. The open space may be partly or completely filled with a sound absorbing material.

The aperture 5 or apertures may comprise an acoustically absorbing material (not shown). In the example acoustic transducer assembly of FIG. 1, the layer of support material is substantially rigid. However a flexible layer of support material may also be used.

The assembly of FIG. 1 comprises a connector 6 to connect to a flat cable 7. The electronic circuit 3 may be arranged for connecting at least a subset of the plurality of transducers 4 with the connector 6. This way, the signals collected by the transducers 4 may be collected at a central location. For example, each of the transducers of the subset may be connected to a separate pin of the connector via a separate electric trace of the electric circuit 3. In addition, shared power supply and/or ground connections may be provided via the electric circuit 3 and the connector 6. Other arrangements of the electric circuit are also possible.

FIG. 2 and FIG. 3 show a similar acoustic transducer assembly as the one shown in FIG. 1. FIG. 2 shows a different kind of connector 8 in combination with a round cable 9. However, any kind of connector and/or cable may be used.

Referring to FIG. 2, the assembly may comprise a handle 13 for enabling a user to hold the assembly in front of a target area. Such a handle may also be provided on other embodiments of the acoustic transducer assembly, some of which will be described in the following. In case of a rigid layer of support material 2, this layer of support material 2 may provide support for the handle, for example by projecting into the handle or by forming at least part of the handle. The handle 13 may comprise signal processing electronics 14 for processing a signal measured by at least one transducer of the plurality of transducers (4). For example, the signal processing electronics 14 may transform the signals from the transducers 4 into a multiplexed digital bit stream, which may be output via the connector 8 using fewer pins. Additionally or alternatively, frequency transforms or other kinds of signal processing relevant for acoustic signals may be performed by the signal processing electronics 14. Moreover, the signal processing electronics 14 does not have to be integrated in a handle. It can be integrated anywhere in the acoustic transducer assembly, for example anywhere on the layer of support material 2, or be provided separately from the acoustic transducer assembly.

FIG. 3 shows a cross sectional view of the acoustic transducer array of FIG. 2. The transducers 4 are mounted on the layer of support material 2 and are part of an electric circuit 3. The acoustic transducers 4 may be implemented as a micro-electro-mechanical system (MEMS). For example, MEMS microphones may be used. Moreover, the MEMS may comprise electronics to locally digitize the signal obtained from the microphone, so that a digital signal may be transported via the electric circuit 3 to the connector 6, 8. The MEMS may be provided as a package which may be mounted on the layer of support material 2. Alternatively, the MEMS may be fully integrated with the layer of support material 2. The transducers may be mounted on the layer of support material in many different ways, for example by means of a MEMS package or by directly placing the acoustic transducer in a placeholder in the layer of support material. The MEMS electronics may also be integrated with the layer of support material 2. The acoustic transducers may comprise any kind of acoustic transducers, including acoustic sensors, acoustic transmitters, and acoustic transmitter-receivers. In case of acoustic transmitters, for example piezoelectric transducers, the acoustic transducer array may be used to generate a particular acoustic wave pattern, for example to transmit an acoustic wave into a particular direction. In case of acoustic sensors, the acoustic transducer array may be used to acquire information about the acoustic wave patterns in a measurement area. This measurement area may be above the transducer array shown in FIG. 3, facing the side of the layer of support material 2 on which the acoustic transducers 4 are mounted. The measurement area may also be all around the acoustic transducer array, depending on the application and the arrangement of the acoustic sensor array. Examples of suitable acoustic sensors include electrostatic (condenser) microphones, piezoelectric microphones, dynamic microphones, silicon microphones, and ultrasonic transducers. Flow sensors may also be used.

Figure 4A:
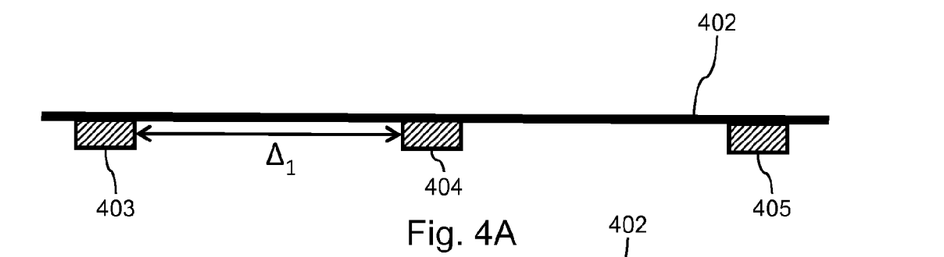
FIG. 4 shows side views of a flexible acoustic transducer assembly in different configurations.

FIG. 4 shows diagrams of an acoustic transducer assembly comprising a flexible layer of support material 402. In FIG. 4A, the flexible layer of support material 402 is straightened, which results in a spacing $\Delta_1$ of the acoustic transducers 403 and 404. The acoustic transducers 403, 404, 405 may be spaced regularly or irregularly. In case of a regular spacing of transducers, the spacing of the transducers may be the same for all transducers in a row 403, 404, 405 of transducers. Since the layer of support material 402 is flexible, it can be bent to a non-planar shape, for example it may be bendable into a cylinder.

Figure 4B:
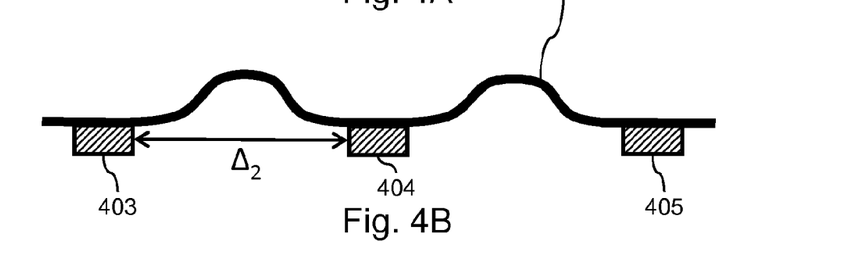
Figure 4C:
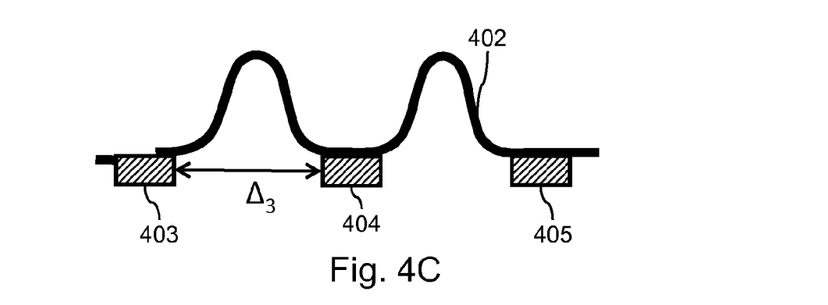

FIG. 4B shows the acoustic transducer assembly of FIG. 4A, wherein the flexible support material 402 is bent to reduce the spacing of the transducers. The spacing of transducers 403 and 404 has been reduced from $\Delta_1$ in FIG. 4A to $\Delta_2$ in FIG. 4B. In FIG. 4C, the spacing has been further reduced to $\Delta_3$. In FIGS. 4B and 4C, the spacing of the transducers has been reduced regularly, which means that the distance between any two transducers in the array is reduced proportionally. However, this is not a limitation. The spacing may be varied irregularly.

It is to be noted that FIG. 4 shows a cross sectional view of a row of transducers, similar to the cross sectional view of the acoustic transducer array of FIG. 3. A two-dimensional array of acoustic transducers on a flexible layer of support material 402 can be constructed, having a layout similar to the one shown in FIG. 1 or FIG. 2, wherein the rigid layer of support material has been replaced by a flexible layer of support material. Apertures may be provided in the flexible layer of support material in the way explained for the rigid support material with respect to FIGS. 1 to 3. For example the apertures may have the form of holes in the layer of flexible support material. Also, different kinds of transducers may be used, as explained elsewhere in this disclosure, regardless of whether flexible or rigid support material 2 is used. The apertures are helpful when reducing the spacing of the transducers in two directions.

Figure 5A:
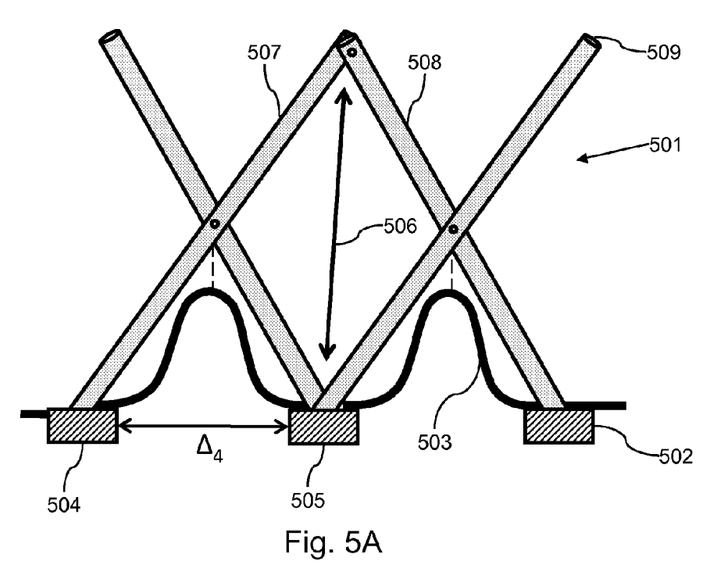
FIG. 5 shows side views of an acoustic transducer assembly with a rigid support in different configurations.

FIG. 5A shows a cross sectional view of an acoustic transducer array having a plurality of transducers 502 and a flexible layer of support material 503, similar to the acoustic transducer array shown in FIG. 4. The acoustic transducer array comprises a rigid support 501. The rigid support may provide a support for at least one of the acoustic transducers 502. In FIG. 5A, all transducers are supported by the rigid support. The acoustic transducers 502 may be fixed to the rigid support 501, for example by gluing. Alternatively, the rigid support may be fixed to the flexible layer of support material 503 at a location where the acoustic transducer 502 is mounted on the flexible layer of support material 503. Although a single row of acoustic transducers is shown in FIG. 5, the acoustic transducer assembly with the rigid support 501 may be extended to support acoustic transducers in a two-dimensional array by a person skilled in the art.

Figure 5B:
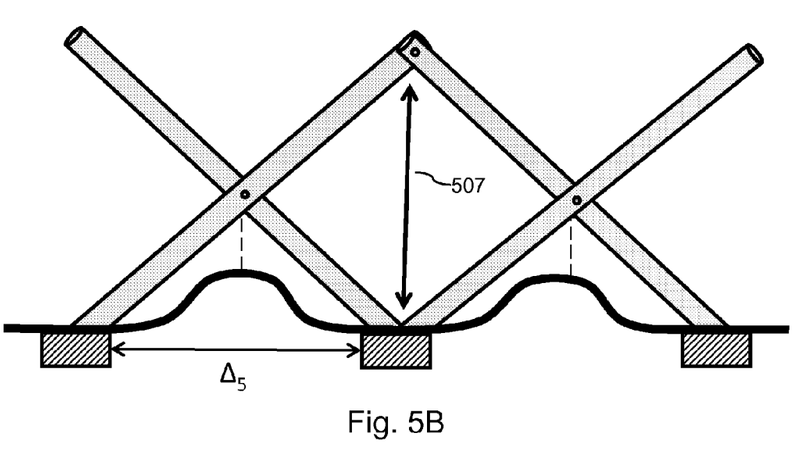

The rigid support 501 shown in FIG. 5 is configurable to change a spacing of the transducers. For example, the distance between a pair of transducers 504, 505 may be changed from $\Delta_4$, as shown in FIG. 5A, to $\Delta_5$, as shown in FIG. 5B. The assembly shown in FIGS. 5A and 5B is arranged for allowing the spacing of the transducers to be adjusted equidistantly. To that end, a transducer 505 is attached to two rigid support members 507 and 508. These rigid support members may be pivotally connected to corresponding support members of neighboring acoustic transducers 502, 504. This way, a chain of pivotally connected support members may be formed which allow to adjust the transducer spacing equidistantly. For example, by reducing the distance 506, 507 between transducer 505 and ends of the support members 507, 508 of neighboring transducers 502 and 504, the spacing of transducers 502, 504, 505 may be increased from $\Delta_4$ to $\Delta_5$. It will be understood that other arrangements of the rigid support are possible. Such arrangements may allow equidistant scaling of the transducer array spacing. It will also be understood that the rigid support may be extended to support a two-dimensional array of transducers.

In FIGS. 5A and 5B, the rigid support has been arranged at one side of the acoustic transducer array. The measurement area (not shown) may be on the other side of the array, away from the rigid support. This way, the rigid support has less influence on the acoustic waves from the measurement area. Also shown in the figure, at least part of the flexible layer of support material 503 is arranged for bending towards the rigid support, away from the measurement area, when the spacing $\Delta_4$ of the transducers 502 is reduced. This further reduces the influence of the flexible layer of support material 503 on the acoustic waves from the measurement area.

It is possible to create a two-layered array of transducers, for example, by attaching acoustic transducers on the opposite sides 509 of the rigid support members. These transducers may be interconnected by means of a similar layer of flexible support material. Other ways to create a multi-layered array of transducers will be apparent to the person skilled in the art in view of this disclosure. The plurality of transducers 4 mounted on the layer of support material form at least part of the multi-layered array.

Figure 6:
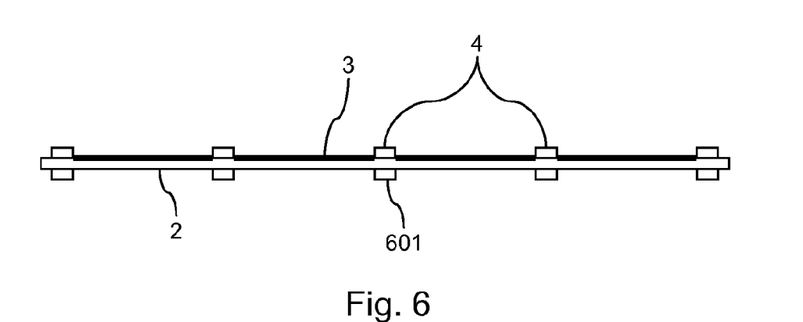
FIG. 6 shows a side view of an acoustic transducer assembly with a double-layered array of acoustic transducers.

FIG. 6 shows a double-layered array of transducers. Each layer may be extended to a two-dimensional array as described above. The layer of support material 2 may be rigid or flexible. The two layers of the double-layered array are formed by transducers 4, 601 mounted on opposite sides of the layer of support material 2. This double-layered array may be part of a multiple-layered array.

Figure 7:
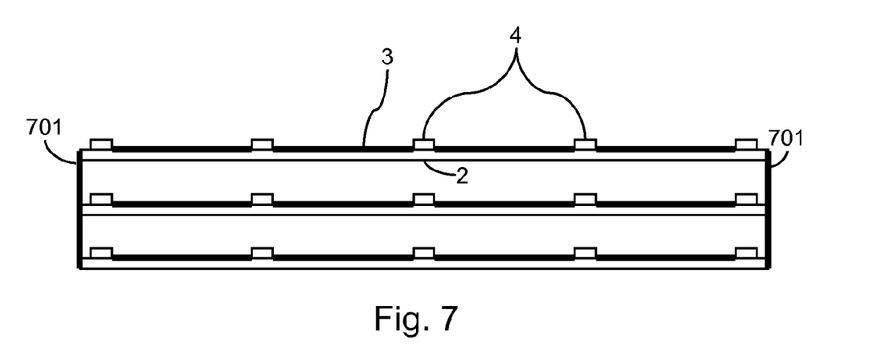
FIG. 7 shows an acoustic transducer assembly with a multi-layered array of acoustic transducers.

FIG. 7 shows another multi-layered array of transducers. This acoustic transducer assembly comprises a stack of layers of flexible or rigid support material 2, with electric circuitry 3 and acoustic transducers 4 and apertures as described above. The stack may be kept together and/or spaced by one or more connecting elements 701. It is also possible to further increase the number of layers by providing acoustic transducers on opposite sides of the layers of support material 2.

Figure 8:
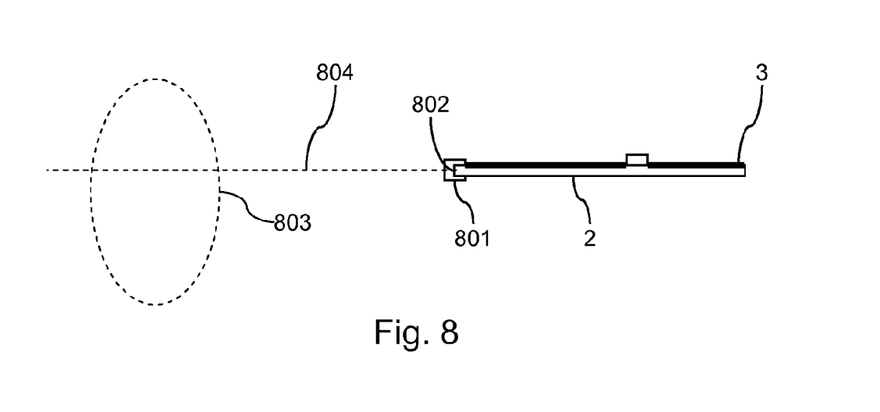
FIG. 8 shows an acoustic transducer assembly with a transducer at an edge of a layer of support material.

FIG. 8 shows an acoustic transducer assembly wherein at least one of the transducers 801 is mounted at an edge 802 of the layer of support material 2, and the assembly is arranged for measuring acoustic signals originating from a measurement area 803 intersecting an extended plane 804 defined by the layer of support material 2. The thickness of the layer 2 may be so chosen that it is smaller than the width of the transducer 802. A row of acoustic transducers 801 may be mounted at the edge 802 of the layer of support material 2. One or more recesses or apertures may be provided in the layer of support material in between successive acoustic transducers 801 of the row of acoustic transducers. These recesses may comprise indentations or notches in the edge of the layer of support material 2.

Figure 9:
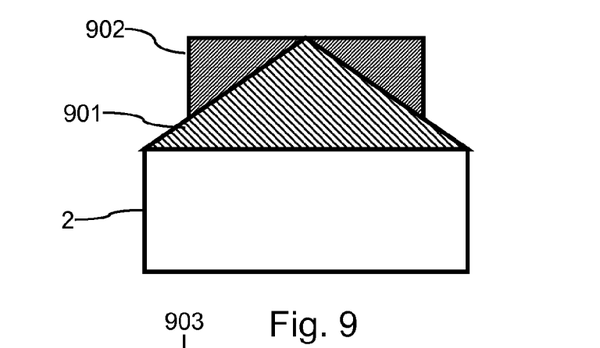
FIG. 9 shows a diagram of a cross sectional side view of a layer of support material.
Figure 10:
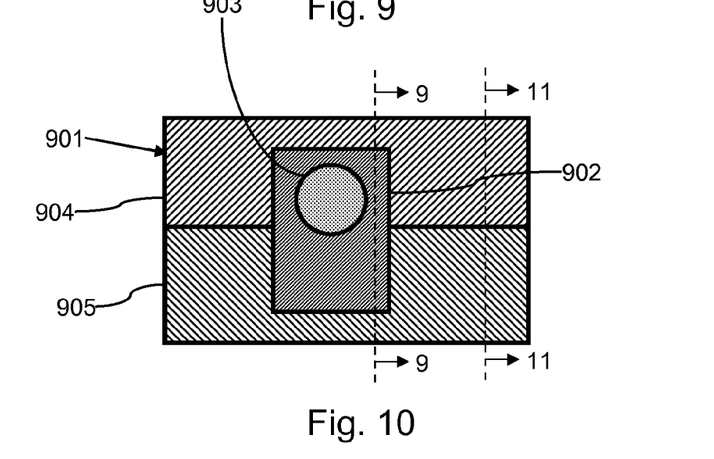
FIG. 10 shows a diagram of a top view of a layer of support material.
Figure 11:
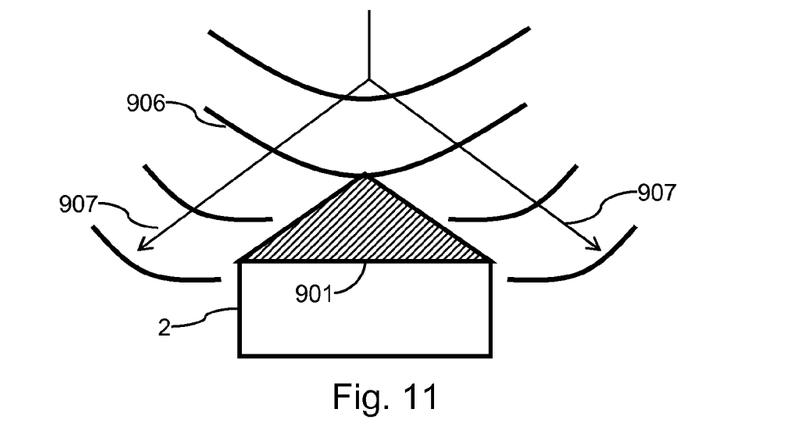
FIG. 11 shows a diagram of a cross sectional side view of a layer of support material.

FIGS. 9, 10, and 11 illustrate another construction of a layer of support material 2 with one or more acoustic sensors 903 mounted thereon. FIG. 10 is a top view, FIG. 9 and FIG. 11 are cross sectional side views. The figures show a portion of an acoustic transducer array. This portion comprises one acoustic transducer 903 of the array. The layer of support material 2 may hold a second layer 901 in a shape which causes acoustic waves to be reflected away from the acoustic source or object of interest. The second layer 901 may at least partly, or completely, cover the layer of support material 2. The second layer 901 may have a triangular cross sectional shape, as is shown in FIGS. 9 and 11. The faces 904 and 905 of the triangular second layer 901 are shaped such that acoustic waves 906 arriving at the second layer 901 follow a path indicated approximately by arrows 907. The acoustic transducer 903, in this illustration, is part of a MEMS acoustic sensor 902. However, other kinds of acoustic transducers may be used. Also, other cross sectional shapes may be effective in reflecting the acoustic waves into a direction away from the acoustic source.

The second layer 901 may be made of a non-reflective material and/or of a reflective material. Also, a coating on the support layer which has low acoustic impedance properties may be beneficial to create an acoustically invisible array. Such a coating may be provided on the second layer 901. Alternatively, when there is no second layer 901, such a coating may be provided directly on the layer of support material 2.

It is to be noted that the number of transducers, as well as the dimension of the array of transducers, can be freely chosen. The numbers of transducers appearing in the drawings are only examples. Larger or smaller numbers of transducers are possible. The array may be one-dimensional, two-dimensional, or three-dimensional. The array may comprise a regular distribution of transducers or an irregular distribution of transducers. Also recesses or apertures may be provided in the layer of support material in a regular or irregular pattern. In the examples shown in FIGS. 1 and 2, square apertures have been provided in the layer of support material in a regular pattern to create crossing strips of support material. The transducers have been mounted on crossing points of these strips of support material. However, this is only an example arrangement. It is possible to create other arrangements, for example with transducers mid-way between the crossing points, on the strips. Also, rectangular and non-rectangular recesses or apertures are possible, for example triangular or pentagonal or circular recesses or apertures. Such recesses or apertures may be used to create a different pattern of strips of support material in the layer of support material, which may be used to create a different distribution of the acoustic transducers.

The acoustic transducer assemblies disclosed herein may be used to measure acoustic data for reconstructing a sound source distribution in a measurement area. Such a reconstruction may be performed by an acoustic holography system. Such a system is known from WO 2009/130243. The acoustic transducer assembly may be connected to a processing system such as a personal computer (PC) via the connector 6, 8 and cable 7, 9. On the processing system, suitable software may be run to process the data and reconstruct the origin of the sound waves measured by the transducers. As described above, alternatively, part (or all) of the processing, including acoustic holography reconstruction, may be performed by processing electronics integrated in the acoustic transducer assembly. The PC may be used for displaying the reconstructed sound distribution. It is also possible to integrate a display with the acoustic transducer assembly for visualizing a reconstructed sound distribution.

The acoustic transducer assembly may be used as follows. An operator may define a measurement area. The measurement area may comprise one or more sound sources, for example comprised in one or more objects. One of the possible goals is to find the locations of these sound sources. The operator may position the acoustic transducer assembly with respect to the measurement area, taking into account the expected frequency distributions and/or the spacing of the acoustic transducers in the acoustic transducer array. In some of the described acoustic transducer assemblies, the spacing of the transducers may be adjusted as described. The distance between the transducer array and the measurement area, as well as the spacing of the transducers, may have an effect on the accuracy of the measurement results. The operator then captures a plurality of acoustic signals using the acoustic transducer assembly. In principle, each of the acoustic transducers can capture an acoustic signal.

Acoustic sensor arrays are used in acoustic or sound imaging applications where the sound-field is sampled at a certain distance from the source of sound and the resulting sound pressure, particle velocity, or sound intensity is measured and visualized. Also, wave-form calculation can be performed before visualization to determine the sound-field on positions other than the original measured positions. Well-known examples of these wave-form reconstruction methods are beam-forming and near-field acoustic holography (NAH).

Digital MEMS microphones can be placed, possibly automatically by pick and place machines, on an array-base layer of support material, such as a PCB. The electronic wiring may already be embedded in the layer of support material, as described above. Thus, a certain array lay-out (either random, equidistant, or other spatial mapping) can be designed in the layer of support material. This allows to design a microphone array that does not have any other wiring directly to the sensors, except for the electric circuitry embedded in the layer of support material. One or more connectors and cables may be used to provide power supply and/or clock signal, and to sample the array.

Furthermore, the support material in between the array sensors and wiring paths can be left out or removed. This creates holes/openings in the layer of support material that may result in less acoustic wave reflections and changes in acoustic impedance. Also, other sensors can be mounted on the layer of support material to assist the acoustic imaging purposes, for example: video camera, light sensors, laser distance measurements, or spatial positioning sensors. These other sensors may also be connected to the electric circuitry. The acoustic transducers may include ultrasonic transducers. Such ultrasonic transducers may be used, among other things, to measure a distance between the acoustic sensor array and an object, by causing an ultrasonic transducer to transmit an ultrasonic signal which is reflected by the object and received by an ultrasonic transducer.

With known PCB technology, it is possible to create flexible and thin foil PCBs. When this technique of flexible and/or thin foil PCBs is applied to the acoustic sensor array, an array can be built having a thin foil PCB as the layer of support material, which may result in a foldable and/or flexible array. The flexibility opens up possibilities to create different transducer array layouts, such as a cylindrical or spherical array layout, using a single layer of support material. Also, the array may be made easily scalable. The flexible layer of support material in between the array sensors may fold back into the structure of a scalable supporting frame. For example, the flexible layer of support material may fold back into triangles formed by parts of the scalable supporting frame, as shown in FIGS. 5A and 5B. This design also works for a two-dimensional array, in particular when apertures or recesses are provided in the layer of support material, for example using the pattern of apertures shown in FIGS. 1 and 2.

Aspects of the invention are set out in the following clauses:

1. An acoustic transducer assembly, comprising
   a layer of support material 2;
   an electric circuit 3 integrated with the layer of support material;
   a plurality of transducers 4 mounted on the layer of support material to form at least part of an array of transducers; and
   a recess or aperture 12 between a pair of the transducers 10, 11 of the array of transducers;
   wherein each of the plurality of transducers 4 comprises electronics to locally digitize a signal obtained from each respective one of the plurality of transducers for providing the signal as a digital signal to the electric circuit 3.
2. The assembly according to clause 1, wherein the recess or aperture 12 comprises a recess or aperture 12 in the support material 2 between a pair of transducers 10,11 of the plurality of transducers mounted on the layer of support material.
3. The assembly according to clause 1, further comprising a connector 6, 8, and wherein the electronic circuit 3 is arranged for connecting at least a subset of the plurality of transducers 4 with the connector 6, 8.
4. The assembly according to clause 1, further comprising a handle 13 for enabling a user to hold the assembly in front of a target area
5. The assembly according to clause 4, wherein the handle 13 comprises signal processing electronics 14 for processing a signal measured by at least one transducer of the plurality of transducers 4.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:
1. An acoustic transducer assembly, comprising
   a flexible layer of support material;
   an electric circuit integrated with the layer of support material;
   a plurality of transducers mounted on the layer of support material to form at least part of an array of transducers;
   a recess or aperture between a pair of the transducers of the array of transducers; and
   a rigid support for supporting at least one transducer of the plurality of transducers, the rigid support being configurable to change a spacing ($\Delta_4$, $\Delta_5$) of the at least one transducer supported thereby, wherein
   each of the plurality of transducers comprises electronics to locally digitize a signal obtained from each respective one of the plurality of transducers for outputting a digital signal via the electric circuit.
2. The assembly according to claim 1, wherein at least part of the flexible layer of support material is arranged for bending away from a measurement area when the spacing ($\Delta_4$) of the at least one transducer is reduced.
3. The assembly according to claim 1, wherein each of the plurality of transducers and the electronics are implemented as a micro-electro-mechanical system.
4. The assembly according to claim 3, wherein the micro-electro-mechanical system is provided as a package mounted on the layer of support material.
5. The assembly according to claim 1, further comprising a printed circuit board which includes the layer of support material and the electric circuit.
6. The assembly according to claim 1, further comprising an acoustically absorbing material in the recess or aperture.
7. The assembly according to claim 1, wherein the acoustic transducer assembly comprises a multi-layered array of transducers, wherein the plurality of transducers mounted on the layer of support material form at least part of the multi-layered array.

8. The assembly according to claim 7, wherein two layers of the multi-layered array are formed by transducers mounted on opposite sides of the layer of support material.

9. The assembly according to claim 1, wherein at least one of the transducers is mounted at an edge of the layer of support material, and wherein the assembly is arranged for measuring acoustic signals originating from a measurement area intersecting an extended plane defined by the layer of support material.

10. The assembly according to claim 1, further comprising a handle for enabling a user to hold the assembly in front of a target area.

11. An acoustic holography system for reconstructing a sound source distribution in a measurement area, the acoustic holography system comprising an acoustic transducer assembly according to claim 1.

* * * * *